United States Patent [19]
Menzel

[11] 3,882,892
[45] May 13, 1975

[54] BUTTON DRIP FEED DEVICE

[75] Inventor: Stanley W. O. Menzel, Elizabeth, Australia

[73] Assignee: Iplex Plastic Industries Pty. Ltd., Elizabeth, Australia

[22] Filed: Feb. 6, 1974

[21] Appl. No.: 439,903

[30] Foreign Application Priority Data
Feb. 14, 1973 Australia................... 2251/73

[52] U.S. Cl................ 137/513.3; 239/542; 138/43; 138/46; 251/145
[51] Int. Cl.............................................. B05b 1/32
[58] Field of Search.... 137/608, 561 R, 315, 561 A, 137/118, 312, 802, 236, 525.3, 525, 513.3, 513.5, 624.27, 599; 251/145, 153, 143; 239/542, 272, 11, 76, 468, 547, 553, 207, 590, 562, 563, 569, 548; 138/92, 42, 44, 45, 43, 46, 37, 251, 126, 125, 127, 205, 208

[56] References Cited
UNITED STATES PATENTS

| | | | |
|---|---|---|---|
| 717,042 | 12/1902 | Smith | 251/145 X |
| 2,021,079 | 11/1935 | Mittendorf et al. | 138/42 |
| 2,127,291 | 8/1938 | Gardner et al. | 138/46 |
| 2,357,278 | 8/1944 | O'Connor | 188/269 |
| 2,511,733 | 6/1950 | Morrison | 138/43 |
| 2,688,978 | 9/1954 | Von Wangenheim | 137/513.5 X |
| 2,723,879 | 11/1955 | Martin | 239/542 X |
| 2,807,279 | 9/1957 | Presnell | 137/493.2 |
| 3,693,888 | 9/1972 | Rondas | 137/513.3 |
| 3,753,527 | 8/1973 | Galbraith | 239/542 X |
| 3,806,031 | 4/1974 | Olson | 239/542 |

FOREIGN PATENTS OR APPLICATIONS
1,225,019  2/1959  France.................. 251/126

Primary Examiner—Martin P. Schwadron
Assistant Examiner—R. J. Miller
Attorney, Agent, or Firm—Oldham & Oldham

[57] ABSTRACT

A button drip feed device in which water is fed into a hollow in a body through a nipple on a base engaged through an aperture in a supply line, and the base is held to the supply line by secondary means, the body having flow control means therein which comprise an elongated groove defined between a resilent pad and a contiguous face and having one end communicating with the hollow and the other end communicating with the outlet, the elongated groove being generally in spiral form with its outer end opening to the hollow and its inner end opening to the outlet, preferably forming a seal between the body and the base by having a peripheral portion engaged between a wall on the base and a surface on said body, and said pad is apertured at said outlet.

11 Claims, 9 Drawing Figures

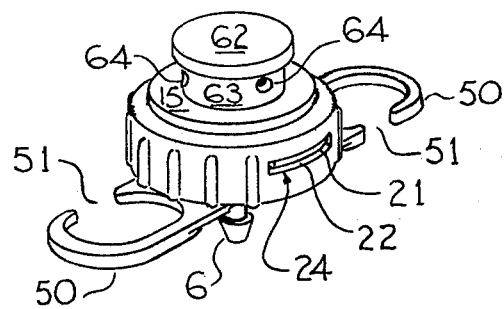
FIG. 1
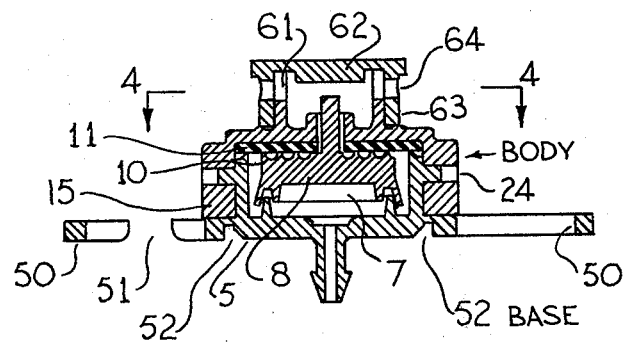
FIG. 2
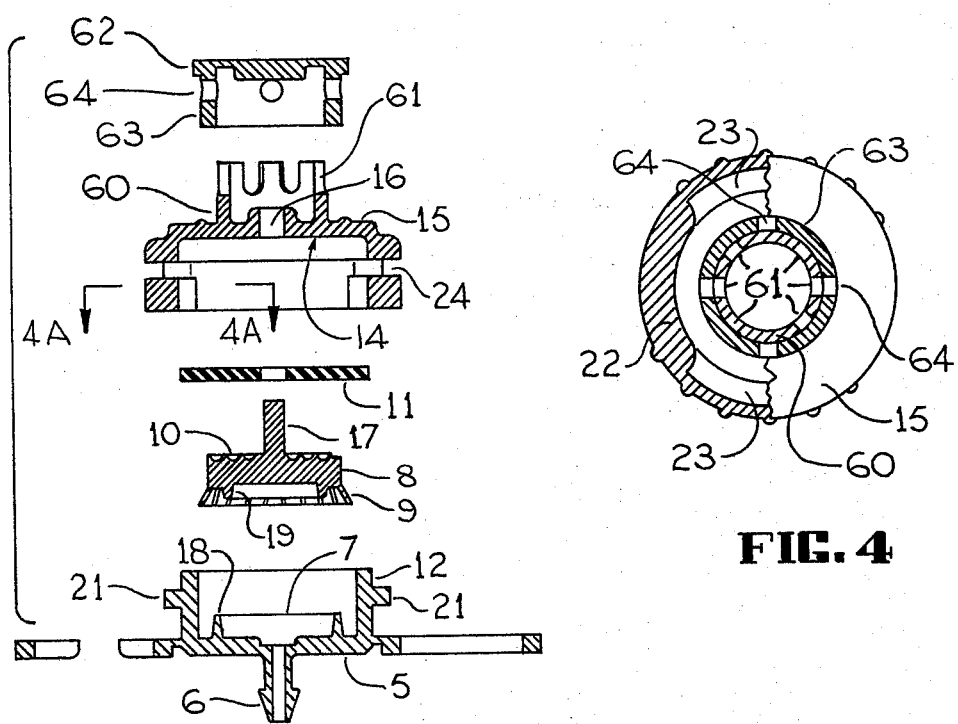
FIG. 3
FIG. 4

BUTTON DRIP FEED DEVICE

This invention relates to a button drip feed device or emitter for use in feeding required quantities of water to an area such as in drip feed devices now commonly used in irrigation projects.

BACKGROUND OF INVENTION

Many forms of drip feed device have been provided heretofore, such as capillary tubes which could be cut to length to increase flow to them at lower pressure areas or which could be adjusted by positioning a plug in a hollow body between which a helical path was formed, and according to an earlier invention of ours it was also proposed to provide automatic compensation by having a distortable member included in the system which reduced the area of the channel through which the feed took place, such a device having been described in co-pending applications, the channel being of either helical or spiral form.

It will be realised that control of the flow to ensure a steady feed of relatively small volume, is not a simple matter because firstly there is usually a long line such as a hose through which the water flows and this has a large number of emitter devices positioned along it, and obviously water pressure will steadily decrease towards the end where the water flow terminates and therefore the last of the drip devices along such a line tends to have a reduced feed because of the reduced pressure of the water reaching this point, such a fall off in pressure being of course progressive along the lines so that the various emitter devices require to be adjusted if uniform output from each is required.

The objects of the present invention are to provide certain improvement to this form of device and particularly to what is generally known since our invention thereof, of a circular form of drip feed device, such as a "button" drip feed device, the terminology arising from the fact that the device is generally in the form of a button which can simply be joined into a line and will give a regulated flow from the device relatively independent of the pressure of the line to which the button is applied.

In this invention various features will be referred to which comprise improvements to this form of device, one of these being a modified form of spiral channel and pressure plate assembly another being a special lock to hold the device in place on a hose or the like, another being a multiple outlet assembly in which the number of outlets effective at any time can be controlled, thus providing a unit which can have a series of outlets arranged to selectively discharge water at any particular point.

SUMMARY OF INVENTION

The button device according to this invention generally comprises a body which is hollow and which has in it, either on a face on a member or on the body, a spiral or similar elongated channel leading from the hollow of the body to an outlet part of the body, the inlet to the spiral channel preferably being near one of the edges of the hollow of the body with the outlet positioned on the axis of the body so that the flow of water will take place inwards from near the outer periphery of the body to the discharge orifice or outlet nipple at the axis of the body.

The device comprises a base which co-operates with the body, the body preferably being locked to the base so that the hollow within the cover is accessible. The hollow defined between the body and the base has within it, a resilient pad which is adapted to have pressed against it a control member or is pressed against a wall of the member, but in either case the spiral groove is defined between the resilient pad and an associated member or part of the body. The water pressure is exerted either on a face on the resilient pad or on a face of a control member.

BRIEF DESCRIPTION OF DRAWINGS

FIG. 1 is a perspective view of a typical button drip feed device,

FIG. 2 is a transverse section of same,

FIG. 3 is an exploded view of FIG. 2,

FIG. 4 is a transverse section on line 4—4 of FIG. 2 to show the multiple distributor head and a part section on line 4A—4A of FIG. 3 to show the method of joining the body to the base.

PREFERRED FORMS OF THE INVENTION

Figure 5:
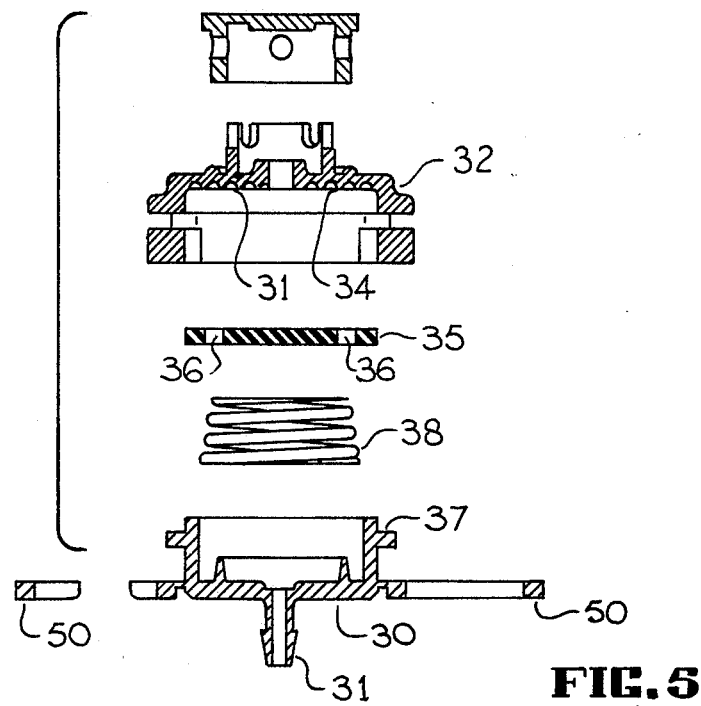
FIG. 5 is an exploded view corresponding to FIG. 3 but showing a modified form of device.

As shown in FIGS. 1 to 4, the base 5 is in the form of a disc having a central projecting barbed nipple 6 on it which can be pushed through an aperture in a supply line such as a hose to make a leak-proof junction with the supply line, allowing water to flow from the supply into the hollow 7 within the device where the control member 8 is positioned, the water flowing to beneath the control member and through its slitted skirt 9 into the channel 10 where flow control takes place by the amount of distortion taking place on the resilient pad 11 due to the water pressure behind it.

The slitted skirt 9 forms a pentral flow barrier between the inlet in the hollow and that part of the hollow which has the groove opening to it.

The pad 11 is held in place between the top of the upstanding annular wall 12 of the base 5 and the lower surface 14 of the body 15, and also forms a seal between the two members to ensure that water must flow into and through the channel 10 in the control member 8.

The control member 8 is guided in an outlet aperture 16 in the body 15 by a fluted stem 17 on the control member 8.

The ridge 18 on the base 5 and the co-operating ridge 19 on the control member 8 ensure that the control member 8 is urged toward the pad 11 by the water pressure, and the slitted skirt 9 can also mechanically add to this loading to keep the control member in correct operating position.

The base 5 is joined to the body 15 by a pair of opposed lugs 21 on the base 5 engaging platforms 22 on the body 15, (see FIG. 4) the lugs 21 being of a dimension to allow them to pass through the spaces 23 to seat on the platforms 22 when the two parts are assembled. The springs 24 facilitate manufacture. The undersurfaces of the lugs 21 are inclined at least at the leading edge to act like a thread.

Cleaning can be effected by simply removing the body should this be necessary, a partial rotation of the body on the base effecting this release.

Figure 6:
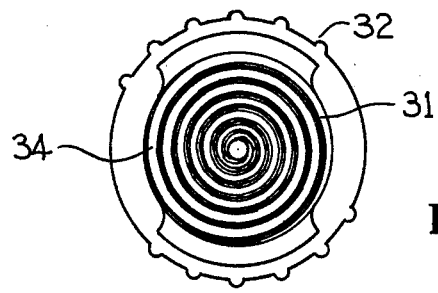
FIG. 6 is an underside view of the body of the device shown in FIG. 5 showing particularly the spiral groove.

In the embodiment shown in FIGS. 5 and 6 the base 30 has a barbed nipple 31 through which water is supplied to the hollow 31, but in this case the body 32 has the spiral groove 33 formed in the lower surface 34 of the body, and the resilient pad 35 in this case has a series of apertures 36 near its periphery to allow water flow to the outer convolutions of the spiral groove, the perimeter of the pad again forming a seal between the body 32 and the wall 37 of the base 30.

A spring 38 between the pad 35 and the base 30 can assist the water pressure to urge the pad 35 against the surface 34.

Figure 7:
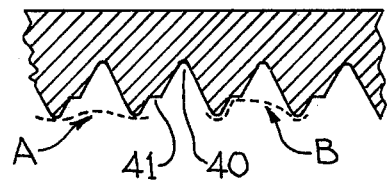
FIG. 7 is an enlarged sectional view showing how the spiral groove can have a compound shape, the dotted line A showing the effective cross-section of the groove at low pressure, the dotted line B showing the effective cross-section of the groove at high pressure.

Instead of having a simple cross-section for the spiral groove, the cross-section of this can be varied, and we have found for instance that a shape such as that shown in FIG. 7 has advantages.

In this the groove 40 has a step 41 in it which increases the amount of control, and it will be obvious that, by varying the shape of the groove an added control is possible.

Also by varying the hardness of the pad, the amount of control due to pressure, can be reduced. If the pad is sufficiently hard automatic control by pressure can be completely removed.

Figure 8:
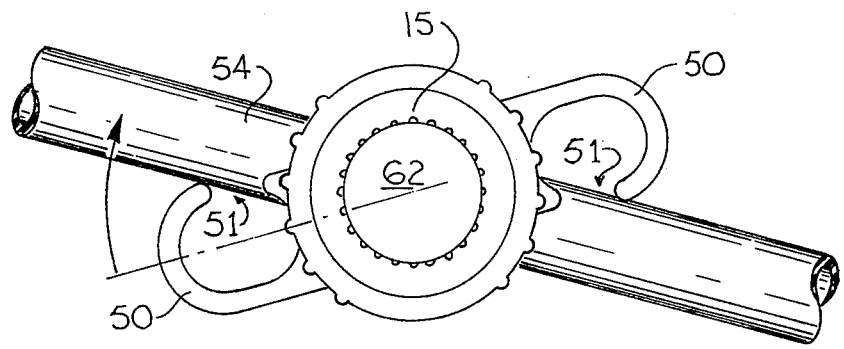
FIG. 8 is a plan view of the device shown in FIG. 1, showing how it is first angularly located on a supply line by the nipple to allow the holding members to be applied in the direction of the arrow.
Figure 9:
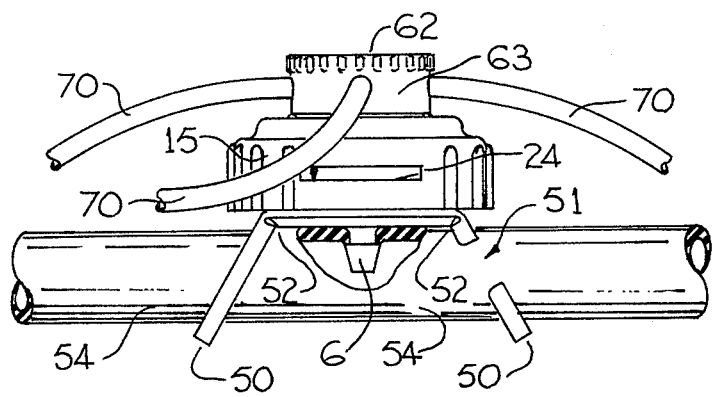
FIG. 9 is a side elevation of the device attached to a pressure line, which is part sectioned to show the nipple, and including a series of distributor tubes on the selector.

Becasue the pressure of water tending to dislodge the barbed nipple 6 can be substantial a further lock is provided between the device and the supply line, this being in the form of a pair of diametrically oppositely spaced looped holding members 50 which have oppositely facing openings 51 so that the device can be engaged on a supply line by pushing the nipple 6 through the aperture in the supply line, (see FIG. 9) and if the device is then turned from the position shown in FIG. 8 to engage the openings 51 of the holding members 50 over the supply line, a firm hold will result as the device could only be unlocked by rotational movement applied to free the two holding members 50 from their partly encircling position on the hose. A reduced thickness formed by a groove 52 allows the holding members 50 to be moved from a position shown in FIG. 1 to that shown in FIG. 9, the unit being moulded from a suitable plastic. A supply tank is designated 54.

Referring again to FIGS. 1 to 4, on the top of a body 15 and coaxial with the outlet from the pressure controlling chamber, is an annular wall 60 having apertures 61 therethrough.

A cap 62 has a depending wall 63 neatly engaging the wall 60, this having apertures 64 which serve as holding means for tube being positioned around the perimeter of the cover (see FIG. 9) so that for instance four tubes could extend from the device to discharge water at four points, but control of discharge is effected by means of the cap 62 which forms a rotatable selector device by allowing the apertures 64 to be lined up with the apertures 61.

It will be noted that in the position shown in FIG. 4 two ports 64 only communicate with the water supply, but if the cap is turned through 45°, four ports would be in communication. The position of the ports could be varied so that by rotation of the selector cap 62, any number of outlets can be brought into operation or alternatively different outlets can be selected so that by a simple manipulation of the selector device, water leaving the emitter can be directed to selected outlet tubes. Such outlet tubes are designated 70 in FIG. 9.

It will be noted that the selector cap 62 described with reference to FIGS. 1 to 4 is included also in FIGS. 5, 6, 8 and 9, but the device in either form could be used without such a selector cap.

It will be realized from the foregoing description that a highly effective form of emitter is provided which can be firmly secured to a hose or the like by simply positioning it by pushing a nipple through an aperture to place the inside of the emitter device into communication with the inside of the hose, and by then rotating the device about its axis, the shaped locking members will engage the hose on each side of the nipple to lock it firmly in place, and as there is normally no rotational force on such a unit, it will remain in position without any fear of being forced away by pressure of water in the hose.

Because of the use of the resilient pad in association with what we term a helical channel, but which in fact could have any shape providing it provides an elongated path for flow of water between the pad and an appropriate part of the emitter, automatic regulation of the output of the device is ensured if such is required because as water pressure within the emitter increases, so the resilient pad will be forced harder onto the surface containing the channel and will automatically restrict flow in proportion to the increased pressure by forcing the resilient pad partway into the channel. As stated earlier, such a pad can be varied in harness according to the control required.

While the device has been referred to generally under the expression "button" emitter it is to be clear that the shape of the device can be varied and the same principles outlined could apply without necessarily having the circular assembly which has been described as the preferred form of the device.

I claim

1. A button drip feed device comprising a body having within it a hollow, an outlet from the hollow of said body, a base engageable on said body to seal said body and close said hollow, an inlet nipple on said base communicating with the hollow within said body to allow water to be fed into said hollow when said nipple is engaged through an aperture in a supply line, means to hold said base to said supply line comprising an upstanding annular wall on said base coaxial with the said inlet nipple and arranged to project into the hollow of the said body, lugs on the said upstanding wall projecting outwardly therefrom, platforms on the said body to receive said lugs when said lugs are moved through spaces between said platforms and the said base is rotated relative to the said body to position the lugs on said platforms to lock the said base to said body, sealing means between said upstanding annular wall and said body, flow control means within said hollow regulating flow from said hollow to said outlet from the hollow, said flow control means comprising a resilient pad and an associated elongated groove defined between said pad and a contiguous face and having one end communicating with said hollow and the other end communicating with said outlet, and means to maintain the said pad and face in contact.

2. Means according to claim 1 characterised in that the elongated groove is in spiral form with its outer end opening to the said hollow and its inner end opening to said outlet.

3. Means according to claim 1 wherein said elongated groove is formed in a front face of a control member positioned within said hollow with the groove face disposed against said pad, and is urged against said pad by water pressure in said hollow against the back of said control member.

4. Means according to claim 1 wherein said elongated groove is formed in a front face of a control member guided within said hollow by a stem into an aperture in said body which aperture also forms the said outlet, whereby said grooved face is disposed against said pad.

5. Means according to claim 1 wherein said control member has a slitted skirt projecting from its peripheral portion to contact said base in said hollow to form a partial flow barrier between said inlet to the hollow and the inlet to said groove.

6. Means according to claim 1 wherein the said pad is formed of resilient material and is held by and forms a seal between said body and said base by having its peripheral portion engaged between a wall on said base which defines the hollow and a surface on said body, said pad being apertured near its peripheral portion to allow water flow from the hollow, through it to the said surface, said surface and the pad in contact with the said surface defining between them an elongated groove having its inlet end in communication with the said apertures near its peripheral portion and having its outlet end in communication with said outlet in the body.

7. Means according to claim 6 characterised by a spring between said pad and said base to urge said pad against said face.

8. Means according to claim 1 characterised in that the lugs are inclined to act to tighten the said base on the said body, and in that the said upstanding wall engages the peripheral portion of the said pad to press it against a face on the said body whereby to seal the said hollow against leakage between the said base and said body.

9. Means according to claim 8 characterised by hook-shaped holding members on said base positioned on opposite sides of the said base in relation to the said inlet nipple and remote from said inlet nipple whereby to partly encircle a supply line and hold said base to said supply line when said inlet nipple is engaged in an aperture through the wall of said supply line.

10. Means according to claim 1 characterised by a member associated with said outlet to form a selector device, said member being adjustable about said outlet to align different outlet apertures, said outlet apertures being adapted to receive tubes whereby to distribute water from said outlets.

11. Means according to claim 1 characterised by a cylindrical wall surrounding the said outlet from the body, apertures in the said wall, cap engaged over said cylindrical wall also having apertures but differently positioned and thereby adapted to be differently registered with the apertures in the said cylindrical wall when the said cap is rotated, said apertures in the cap being adapted to receive tubes whereby to distribute water from said outlets.

* * * * *